United States Patent
Aiello et al.

(10) Patent No.: US 6,593,708 B2
(45) Date of Patent: Jul. 15, 2003

(54) ELECTRONIC CIRCUIT FOR THE GRADUAL START-UP OF ELECTRIC LOADS, PARTICULARLY HALOGEN LAMPS

(75) Inventors: Natale Aiello, Trecastagni (IT); Atanasio La Barbera, Mascalucia (IT); Giovanni Luca Torrisi, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/970,164

(22) Filed: Oct. 1, 2001

(65) Prior Publication Data

US 2002/0101182 A1 Aug. 1, 2002

(30) Foreign Application Priority Data

Oct. 2, 2000 (IT) ...................... MI2000A2126

(51) Int. Cl.[7] .............................................. H05B 41/00
(52) U.S. Cl. ............... 315/291; 315/209 R; 315/200 R; 315/DIG. 7; 315/307
(58) Field of Search ................................ 315/291, 224, 315/200 R, 307, DIG. 2, DIG. 5, DIG. 7, 308, 209 R; 363/49

(56) References Cited

U.S. PATENT DOCUMENTS

| | | | | |
|---|---|---|---|---|
| 4,334,147 A | * | 6/1982 | Payne | 219/497 |
| 4,645,982 A | * | 2/1987 | Takayanagi | 315/307 |
| 5,089,751 A | * | 2/1992 | Wong et al. | 315/279 |
| 5,699,238 A | * | 12/1997 | Lee et al. | 363/21.03 |
| 6,433,493 B1 | * | 8/2002 | Ilyes et al. | 315/291 |

* cited by examiner

*Primary Examiner*—Don Wong
*Assistant Examiner*—Ephrem Alemu
(74) *Attorney, Agent, or Firm*—Lisa K. Jorgenson; Allen, Dyer, Doppelt, Milbrath & Gilchrist, P.A.

(57) ABSTRACT

An electronic circuit is for the gradual start-up of electric loads, particularly halogen lamps. The circuit may include a power device having an output terminal connected to the electric load and having at least one control terminal receiving a predetermined driving current value. The circuit may further include a comparator having a first input terminal coupled to the power device output and a second input terminal kept at a reference potential. The comparator output may be connected to a controlled switch inserted upstream of the control terminal to control the opening of the switch and adjust the start-up phase of the power device according to the value of the reference potential.

27 Claims, 3 Drawing Sheets

I=2A/div
t=20ms/div

Ic=1A/div
t=50ms

ELECTRONIC CIRCUIT FOR THE GRADUAL START-UP OF ELECTRIC LOADS, PARTICULARLY HALOGEN LAMPS

FIELD OF THE INVENTION

The present invention relates to an electronic circuit for the gradual start-up of electric loads, such as halogen lamps. More particularly, but not exclusively, the invention relates to an electronic circuit comprising a power device having an output terminal connected to the electric load and at least one control terminal receiving a predetermined driving current value.

BACKGROUND OF THE INVENTION

In the following description reference will be made to an electric load represented by a halogen lamp without limitation to other similar types of loads. For almost all the applications involving electric loads there is the need for reducing the stress applied to the driving circuit during the switching phases of the power device.

The start-up phase is considered a stress condition for halogen lamp driving. Indeed, the start-up phase is comparable to a short circuit, with the current in the driving circuit and in the load reaching high values. This condition ends when the lamp impedance changes because of the internal filament heating as this causes a reduction of the load current to the nominal value.

The starting condition in which the load current is considerably high deteriorates the lamp filament and adversely influences lamp life. It is therefore desired to limit the number of high-current oscillations that the circuit and the load sustain without excessively varying the lamp trigger time. The lower the current flowing in the load, the slower the load heats, and, consequently, the slower the system ends the start-up phase.

An excessive current reduction in the start-up phase would result in a lamp start-up delay perceivable by the human eye. For example, a time period of 300–400 ms is generally considered as an optimum time for the lamp to reach the steady state condition.

FIG. 1 is a schematic diagram of the structure of an AC/AC converter used for halogen lamp driving in accordance with the prior art. Differently from what happens with fluorescent lamps, the circuit 1 of FIG. 1 is powered by an external AC voltage source network, rectified at double half-wave. A diac 2 enables the converter circuit during each supply cycle.

The circuit 1 comprises a power device 3 in each portion of a half-bridge structure including a pair of driving elements. More particularly, a high side driver component 4 and a low side driver component 5 are connected in series between a high supply voltage reference and a ground GND. The interconnection node X between the components 4 and 5 is connected to a halogen lamp 6. A first winding 7 is provided between the node X and the high side component 4, while a second winding 8 is provided between the node X and the second low side component 5.

The current Iload flowing in the lamp 6 is alternately switched, preferably at a frequency of 30 to 50 KHz, by the half-bridge branches. The high supply voltage is derived from the alternating current (AC) external supply through the diac 2. Several RC circuits are provided between the high supply voltage and ground to obtain voltage values to be applied to the low side component 5 or to the high side component 4.

For these applications a circuit 9 shown in FIG. 2 is typically used. This circuit serves to implement a gradual start-up, generally called a "soft start-up". The circuit 9 has a first terminal connected to the voltage supply Valim, produced inside circuit 1, and a second terminal connected to the node X.

This circuit 9 comprises a power bipolar transistor Q1 having collector and emitter terminals coupled to the second terminal and to ground respectively. A sensing resistor Rsense is provided between the emitter and ground for measuring the current Ie flowing through the conduction terminals.

The base terminal B1 of the transistor Q1 is coupled to the first supply terminal by a diac D and a resistance R3. A second bipolar transistor Q2 has its conduction terminals, that is, the collector and emitter terminals, connected respectively to the transistor base B1 by the diac D and to ground. A capacitor Cd is connected in parallel between the driving terminal and conduction terminal of the transistor Q2.

A resistance R2 is provided between the base B2 of the second transistor Q2 and ground. An electrolytic capacitance C1 is included in a first circuit portion comprising the resistance R2 and an additional resistance R1 having a terminal connected to the base B2. The capacitance C1 is inserted also in a second circuit portion comprising the resistor Rsense and a diode D1.

The electrolytic capacitance C1 is charged when the voltage drop Rsense*Ie is higher than the voltage sum Vbed1+VC1 and drives the transistor Q1. The time constant generated by the capacitance C1 and the resistance R1 has a high value and ensures that the transistor Q1 is kept in the on state for several half waves of the supply voltage waveform Valim.

The transistor Q1 performs the function of draining part of the current which would flow, though the resistance R3, on the capacitor Cd, thus slowing the corresponding charge and delaying the start of the diac 2. This causes a shift of the instant in which, in the half wave of the supply voltage, the circuit 9 starts oscillating. Because of the gradual impedance variation inside the lamp, the currents become lower and lower and the transistor Q1 will have less base current available if the capacitance C1 is charged at a lower value.

Consequently, the diac 2 will be delayed by a lower time than the previous half wave. Therefore, the circuit 9 will keep on operating, but with a decreasing impact, until the current switched in the lower branch reaches the steady state value.

SUMMARY OF THE INVENTION

In view of the foregoing background, it is therefore an object of the present invention to provide an electronic circuit for the gradual start-up of electric loads, in particular halogen lamps, having relatively simple structural and functional characteristics and allowing the start-up phase to be driven in a rapid, but also gradual way. This avoids or reduces any stress on the halogen lamp filament and on the driving circuitry, overcoming the shortcomings of prior art approaches.

The present invention reduces the current supplied alternately by the two branches of the power device at an appropriate value. Such an appropriate value should generally be twice the nominal value, for example.

By checking the maximum value of the load current, besides protecting the lamp filament, it is also possible to influence the corresponding heating dynamics. The circuit according to the invention drives the start-up phase duration in a manner directly depending on the selected limitation value.

One embodiment of the invention relates to an electronic circuit for the gradual start-up of electric loads, particularly halogen lamps. The electronic circuit may comprise a power device having an output terminal connected to the electric load and having at least one control terminal receiving a predetermined driving current value, and a comparator having a first input terminal coupled to the power device output and a second input terminal kept at a reference potential. In addition, the circuit may include a controlled switch driven by the output of the comparator and inserted between the control terminal of the power device and a voltage reference to be driven according to the value of the reference potential, thus adjusting the start-up phase of the power device.

BRIEF DESCRIPTION OF THE DRAWINGS

The features and advantages of the circuit according to the invention will become apparent from the following description of an embodiment thereof given by way of non limiting example with reference to the accompanying drawings, in which.

DETAILED DESCRIPTION OF THE PREFERRED EMBODIMENTS

With reference to the drawings, an electronic circuit according to the invention for the gradual start-up of an electric load 11 driven by a switching power device 12 is generally and schematically indicated with 10. We will refer hereinafter to a power device 12 corresponding to any electronic component being effective to switch electric loads 11 on and off, by supplying the load with a relatively high current (switch on) or interrupting the current flow (switch off). We will further refer hereinafter to an electric load 11 corresponding to any electric or electronic component activated by a current flow or by a predetermined voltage value applied to its terminals. Within the scope of the present invention, the electric load can be resistive or inductive, as for example, a halogen lamp.

Figure 3:
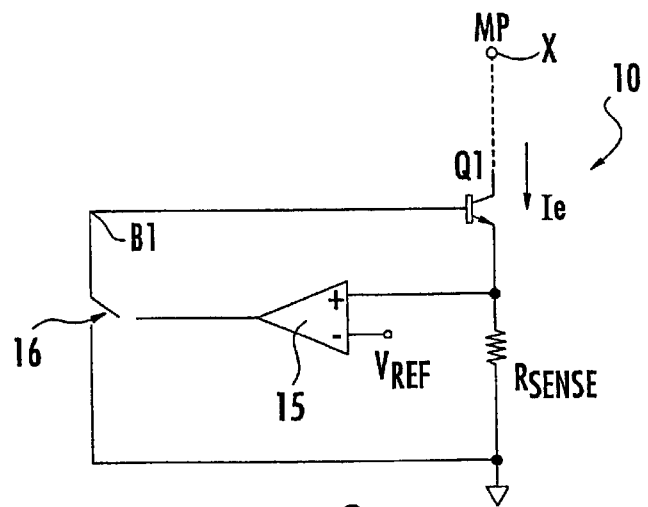
FIG. 3 is a schematic block view of an embodiment of the circuit according to the invention.

With reference to the example of FIG. 3, the circuit according to the invention can be represented schematically by a comparator 15 having an input, for instance the non-inverting input, connected to the transistor Q1 emitter and to the resistor Rsense. The other input, that is the inverting input, is connected to a stable voltage reference Vref. The comparator 15 output is connected to drive a controlled switch 16 inserted between the base terminal B1 of the transistor Q1 and the ground.

When the voltage drop Ie*Rsense is equal to the reference value Vref, the comparator 15 switches. This activates the closure of the switch 16 which performs the function of switching off the power device, represented by the transistor Q1. By checking or limiting the maximum value of the load current, besides protecting the lamp filament, it is also possible to influence the heating dynamics thereof. The soft start-up circuit 10 according to the invention allows defining a start-up duration which depends directly on the selected limitation value.

Figure 1:
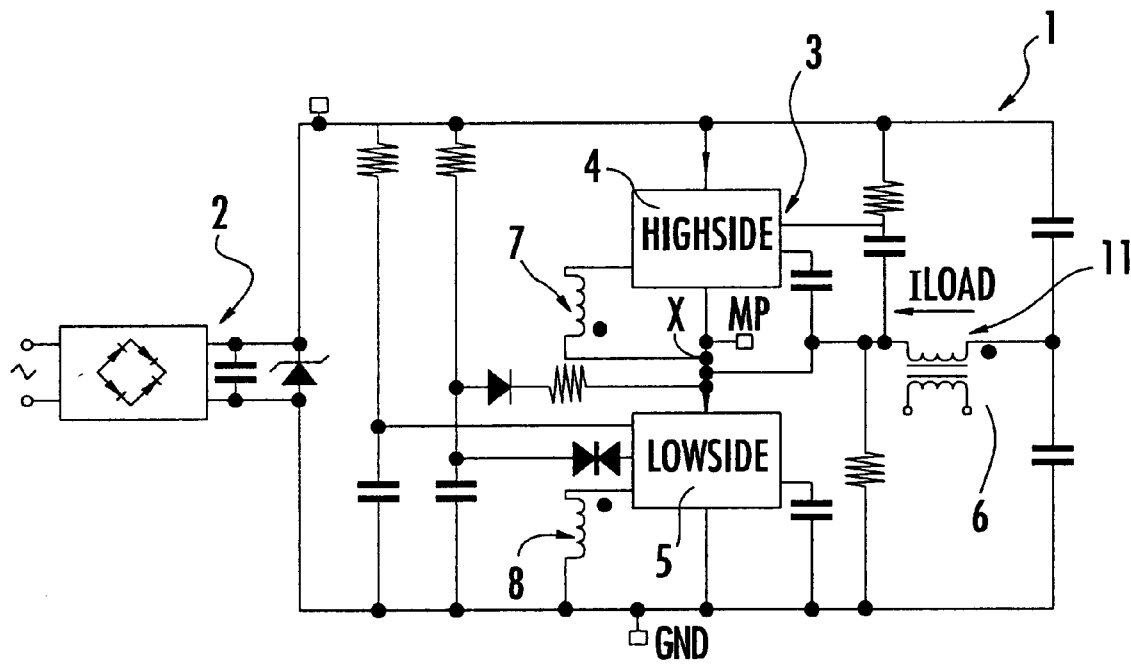
FIG. 1 is a schematic view of an AC/AC converter circuit and attached driving portion of an electric load according to the prior art.
Figure 2:
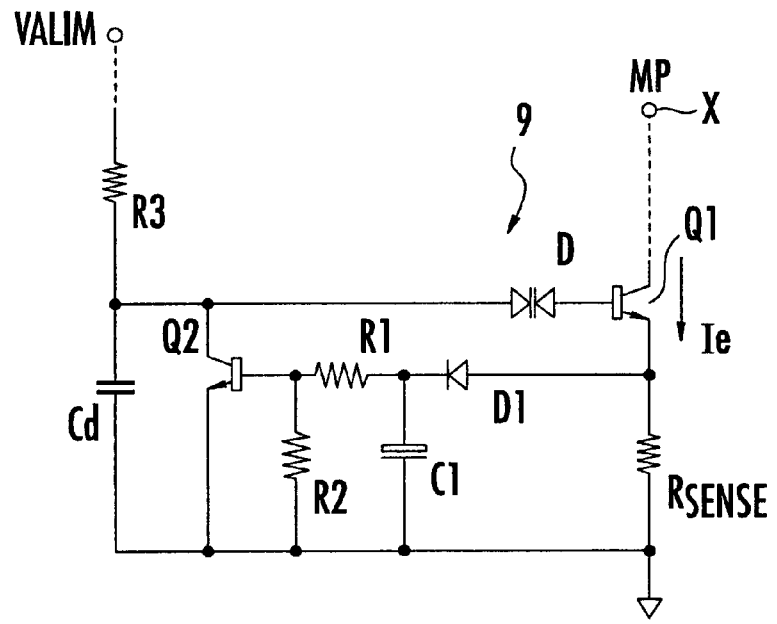
FIG. 2 is a schematic view of a circuit portion working with the circuit of FIG. 1 according to the prior art.
Figure 4:
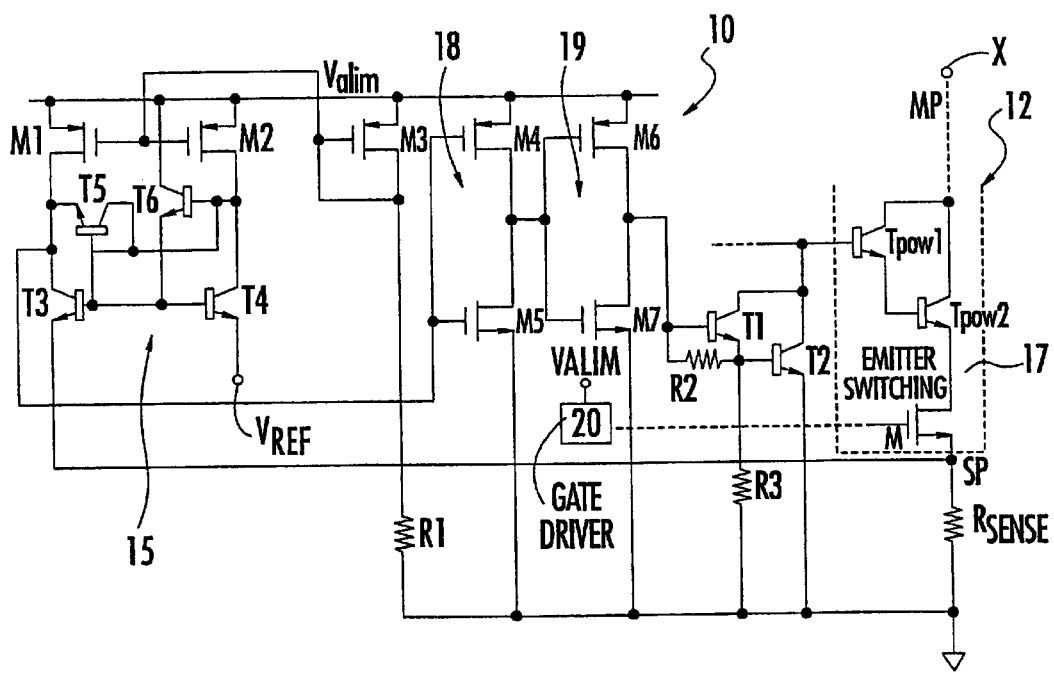
FIG. 4 is a schematic view in greater circuit detail of the embodiment of FIG. 3.

The example of FIG. 4 shows a preferred embodiment of the invention to be incorporated in a AC/AC converter such as that of FIG. 1. Advantageously, the power device 12 has an emitter-switching structure 17, including a Darlington bipolar stage. In practice, instead of the transistor Q1 of FIG. 2, the circuit 10 according to the invention comprises a low voltage MOS power transistor M having conduction terminals coupled to the node X, through the Darlington stage, and to a node SP for connection to the sensing resistor Rsense. A pair of interconnected bipolar power transistors Tpow1 and Tpow2 in a Darlington configuration are provided between one terminal of the transistor M and the node X.

The comparator 15 is implemented through a differential cell comprising a bipolar transistor input stage and a MOS transistor bias stage. An input of the comparator 15 is connected to the node SP and the input stage comprises a differential pair of npn-type transistors T3, T4 powered by PMOS transistors M1 and M2 which are current mirrors of a transistor M3.

A second input of the comparator 15, coincident with the transistor T4 emitter terminal, is kept at a reference potential Vref which fixes the limitation value. The voltage reference Vref has the same thermal coefficient as the potential on the node SP, to ensure that the limitation current keeps constant even when the temperature varies.

A pair of MOS transistor inverters 18 and 19 is cascade-connected to the comparator 15 output. A first inverter comprises a complementary pair M4, M5 while the second inverter comprises a second complementary pair M6, M7. The switch 16 is preferably implemented through a Darlington structure of bipolar transistors T1 and T2 downstream-connected to the pair of inverters 18 and 19 and connected also to the base terminal of the first power transistor Tpow1 of the Darlington structure 17. When the potential on the node SP is higher than the reference Vref, the transistor T3 is in the on state and the comparator 15 output, which is squared by the double inverter 18, 19, is in a low logic condition.

When the Darlington structure implementing the controlled switch 16 is in the off state, the transistor Tpow1 base can vary freely. As soon as the signal on the node SP equals the reference Vref, and therefore SP>Vref, the transistor T3 switches off and the comparator 15 output reaches a high logic signal. Under these conditions, the Darlington structure T1, T2 switches on and triggers the limitation of the emitter switching 17. The adjustment of the transistor Tpow1 base current increases the drop of the collector-emitter voltage Vce of the transistor Tpow2 with subsequent adjustment of the load current. The duration of the limitation condition is fixed by control circuitry connected to the gate terminal of the MOS transistor M.

The gate terminal of the transistor M is driven by a Gate Driver block 20 which draws the voltage from the supply Valim. The block 20 also receives an enable signal of voltage Vsec by a terminal IN of the circuit 10. The Gate Driver block 20 performs the function of supplying to the gate of transistor M a useful signal when a secondary current is present.

Figure 5:
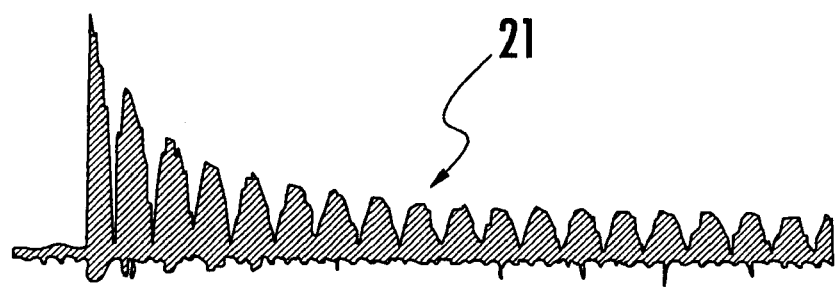
FIGS. 5 and 6 are comparative diagrams of current signals during the start-up phase in a prior art circuit and in the circuit according to the invention respectively.
Figure 6:
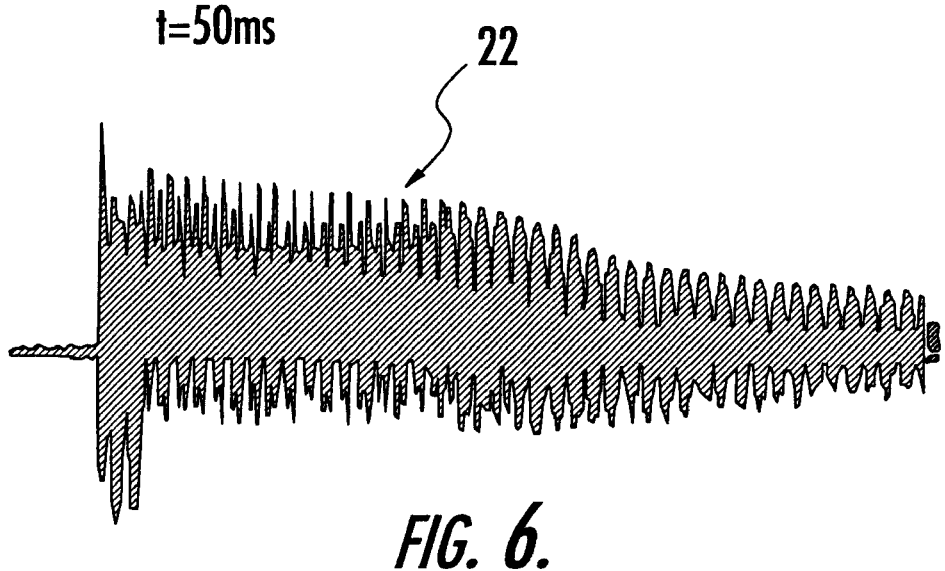

FIGS. 5 and 6 show the start-up waveforms in a prior art circuit and in the present invention respectively. In the first waveform, indicated with 21, high current values flow in the load, even if only for few cycles. The lamp 4 reaches the steady condition in a time period of about 100 ms.

In the second waveform, indicated with 22, current signals flow in the load, which are equal to the limitation signal Vref, for several cycles and the lamp reaches the steady state condition in a time period of about 400 ms. To decrease this time period, it is sufficient to increase the limitation value Vref.

Therefore, the circuit according to the invention addresses the problem and provides several advantages. Perhaps the most important being that the load start-up is carried out in the desired gradual manner adjustable by simply adjusting the reference potential Vref. A further advantage is that the circuit according to the invention can be totally integrated on a semiconductor substrate, with the well known corresponding advantages thereof.

From the foregoing it will be appreciated that, although specific embodiments of the invention have been described herein for purposes of illustration, various modifications may be made without deviating from the spirit and scope of the invention. M Accordingly, the invention is not limited except as by the appended claims.

That which is claimed is:

1. An electronic circuit for providing a gradual start-up of an electric load and comprising:
    a switching power device having an output terminal connected to the electric load and having at least one control terminal;
    a comparator having a first input terminal connected to the output terminal of said switching power device, having a second input terminal connected to a first reference voltage, and having an output terminal; and
    a controlled switch connected between the at least one control terminal of said switching power device and a second reference voltage, said controlled switch being driven by the output terminal of said comparator to thereby adjust a start-up phase of said switching power device based upon the first reference voltage.

2. An electronic circuit according to claim 1 wherein said comparator comprises a differential cell comprising a bipolar transistor input stage, and a MOS transistors bias stage connected thereto.

3. An electronic circuit according to claim 1 further comprising a pair of cascade-connected inverters connected between the output terminal of said comparator and said controlled switch.

4. An electronic circuit according to claim 1 wherein said controlled switch comprises a pair of bipolar transistors connected together in a Darlington configuration.

5. An electronic circuit according to claim 4 wherein said pair of bipolar transistors are connected to the at least one control terminal.

6. An electronic circuit according to claim 1 wherein said switching power device comprises an emitter switching structure.

7. An electronic circuit according to claim 6 wherein said emitter switching structure comprises:
    first and second bipolar transistors connected together in a Darlington configuration; and
    a MOS power transistor having a conduction terminal connected to said first bipolar transistor.

8. An electronic circuit according to claim 7 said first bipolar transistor has a base terminal which defines the at least one control terminal of said switching power device.

9. An electronic circuit for providing a gradual start-up of an electric load and comprising:
    a driver;
    a switching power device having a conduction terminal connected to the electric load and having at least one control terminal connected to said driver;
    a comparator having a first input terminal connected to the conduction terminal of said switching power device, and having a second input terminal connected to a first reference voltage; and
    a switching control circuit connected between said driver and the at least one control terminal of said switching power device, said switching control circuit being driven by said comparator to thereby adjust a start-up phase of said switching power device based upon the first reference voltage.

10. An electronic circuit according to claim 9 wherein said comparator comprises a differential cell comprising a bipolar transistor input stage, and a MOS transistors bias stage connected thereto.

11. An electronic circuit according to claim 9 further comprising a pair of cascade-connected inverters connected between said comparator and said switching control circuit.

12. An electronic circuit according to claim 9 wherein said switching control circuit comprises a pair of bipolar transistors connected together in a Darlington configuration.

13. An electronic circuit according to claim 12 wherein said pair of bipolar transistors are connected to the at least one control terminal.

14. An electronic circuit according to claim 9 wherein said switching power device comprises an emitter switching structure.

15. An electronic circuit according to claim 14 wherein said emitter switchinq structure comprises:
    first and second bipolar transistors connected together in a Darlington configuration; and
    a MOS power transistor having a conduction terminal connected to said first bipolar transistor.

16. An electronic circuit according to claim 15 wherein said first bipolar transistor has a base terminal which defines the at least one control terminal of said switching power device.

17. An AC-to-AC converter comprising:
    a rectifier; and
    an electronic circuit connected to said rectifier for providing a gradual start-up of an electric load, said electronic circuit comprising
    a switching power device having an output terminal connected to the electric load and having at least one control terminal,
    a comparator having a first input terminal connected to the output terminal of said switching power device, having a second input terminal connected to a first reference voltage, and having an output terminal, and
    a controlled switch connected between the at least one control terminal of said switching power device and a second reference voltage, said controlled switch being driven by the output terminal of said comparator to thereby adjust a start-up phase of said switching power device based upon the first reference voltage.

18. An AC-to-AC converter according to claim 17 wherein said comparator comprises a differential cell comprising a bipolar transistor input stage, and a MOS transistors bias stage connected thereto.

19. An AC-to-AC converter according to claim 17 further comprising a pair of cascade-connected inverters connected between the output terminal of said comparator and said controlled switch.

20. An AC-to-AC converter according to claim 17 wherein said controlled switch comprises a pair of bipolar transistors connected together in a Darlington configuration.

21. An AC-to-AC converter according to claim 20 wherein said pair of bipolar transistors are connected to the at least one control terminal.

22. An AC-to-AC converter according to claim 17 wherein said switching power device comprises an emitter switching structure.

23. An AC-to-AC converter according to claim 22 wherein said emitter switching structure comprises:

first and second bipolar transistors connected together in a Darlington configuration; and a MOS power transistor having a conduction terminal connected to said first bipolar transistor.

24. An AC-to-AC converter according to claim 23 wherein said first bipolar transistor has a base terminal which defines the at least one control terminal of said switching power device.

25. A method for providing a gradual start-up of an electric load using an electronic circuit comprising a switching power device having an output terminal connected to the electric load and having at least one control terminal, the method comprising:

comparing a signal at the output terminal of the switching power device to a first reference voltage; and controlling a switch connected between the at least one control terminal of the switching power device and a second reference voltage responsive to the comparing to thereby adjust a start-up phase of the switching power device based upon the first reference voltage.

26. A method according to claim 25 wherein the switching power device comprises:

first and second bipolar transistors connected together in a Darlington configuration; and a MOS power transistor having a conduction terminal connected to the first bipolar transistor.

27. A method according to claim 26 wherein the comparing comprising using a comparator including a differential cell comprising a bipolar transistor input stage, and a MOS transistors bias stage connected thereto.

* * * * *